United States Patent [19]

Heinonen

[11] Patent Number: 4,842,079

[45] Date of Patent: Jun. 27, 1989

[54] BODY CONSTRUCTION FOR A DRILLING MACHINE

[75] Inventor: Jarmo Heinonen, Tampere, Finland

[73] Assignee: Oy Tampella AB, Tampere, Finland

[21] Appl. No.: 40,354

[22] Filed: Apr. 20, 1987

[30] Foreign Application Priority Data

May 9, 1986 [FI] Finland .................................. 861938

[51] Int. Cl.[4] .............................................. B23B 45/16

[52] U.S. Cl. ..................................................... 173/105

[58] Field of Search ................ 173/105, 101, 147, 162

[56] References Cited

U.S. PATENT DOCUMENTS 3,844,359 10/1974 Zettergren et al. ................. 173/105

4,161,990 7/1979 Forsberg et al. .................... 173/105

4,576,240 3/1986 Matsumoto .......................... 173/105

*Primary Examiner*—Paul A. Bell

*Assistant Examiner*—Willmon Fridie, Jr.

*Attorney, Agent, or Firm*—Ladas & Parry

[57] ABSTRACT

A body construction for a drilling machine comprising a body provided with end covers, a percussion means mounted in the body, and a rotation means positioned on an axial extension of the percussion means for rotating a shank. In order to avoid the use of conventional tie rods, the body is formed by an integral body part, and housings for the percussion and the rotation means are formed in the body part in such a way that the percussion and the rotation means can be replaced through the corresponding end covers without having to detach from the body anything else but the end covers of the body part.

6 Claims, 1 Drawing Sheet

BODY CONSTRUCTION FOR A DRILLING MACHINE

Figure 1:
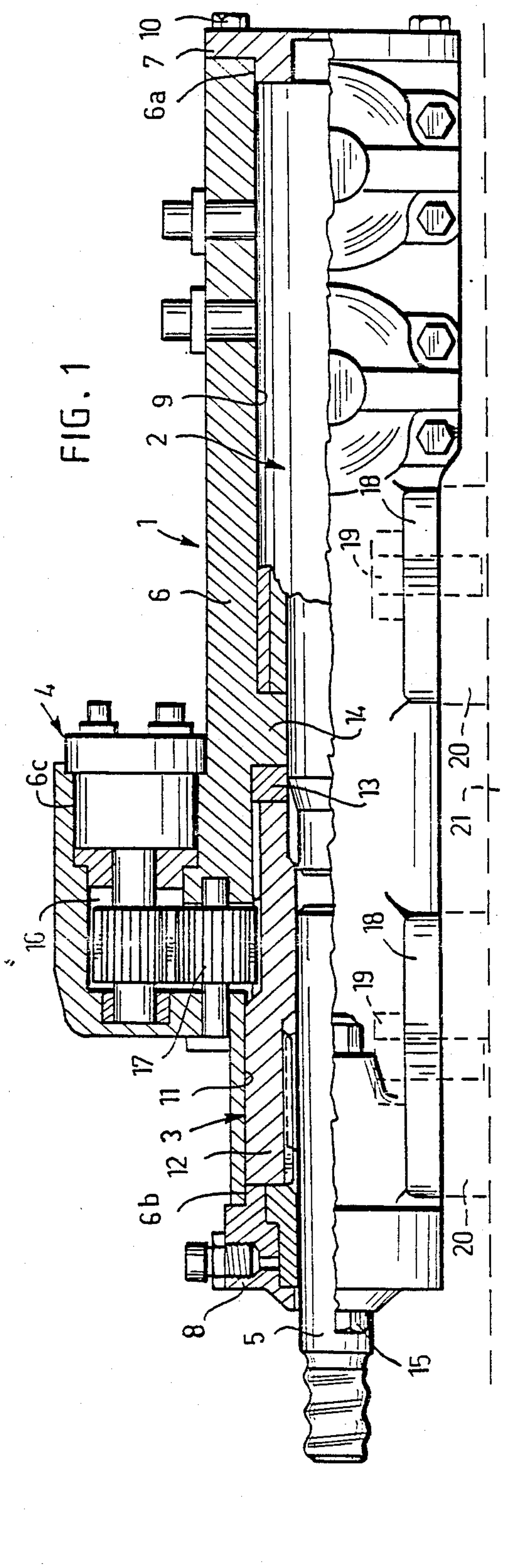

This invention relates to a body construction for a drilling machine comprising a body to be mounted on a feeding means of a drilling equipment and end covers closing opposite ends of the body, and a percussion means mounted in the body and a rotation means positioned on an axial extension of the percussion means for rotating a shank, said body comprising housings for the percussion means and the rotation means.

In conventional hydraulic percussion drilling machines, a percussion means mounted in the body is intended to direct successive axial percussions on a shank intended to be fastened to a drill rod. The shank is mounted rotatably and axially slideably in the body by means of a rotation bushing which is in engagement with a rotation machinery supported by the body. The front cover of the body is provided with means for mounting and supporting the shank.

In known rock drilling machines the body comprises two or more separate body portions one of which is provided with a housing for the percussion means, one with a housing for the rotation machinery, one with a housing for the rotation bushing, etc. The different body portions are connected axially one after another by means of long tie rods to form a stationary unit, and the ends of the obtained body are closed with end covers.

However, a body construction formed by separate body portions has several major disadvantages. All the inner parts belonging to the drilling machine cannot be replaced without releasing the tie rods connecting the body portions, because the body has to be dismounted for the replacement. The dismounting of the body, in turn, requires that the drilling machine is first detached from the feeding means. Due to the strains created during the drilling process, the connecting surfaces between the body portions are exposed to wear, and in order to avoid this wear the connecting surfaces are made large in area, which increases the weight of the body portions. As the body is assembled of separate body portions, the body portions which are machined separately require a great accuracy of manufacture, and body portions made of steel have to be hardened by heat treatment and ground. The loosening or breaking of tie rods due to the drilling strains cause a risk of damage. Furthermore, the attachment of a body construction set up by means of tie rods to the feeding means of the drilling equipment requires a special carriage to which the body of the drilling machine is secured and which provides additional support to the assembled body.

The object of the present invention is to provide a body construction for a drilling machine, which construction avoids the disadvantages mentioned above and makes conventional tie rods unnecessary. This object is achieved by means of a body construction according to the invention which is characterized in that the body comprising the housings for the percussion and the rotation means is formed by an integral body part, and that the housings for the percussion and the rotation means are formed in the body part in such a manner that the percussion means and the rotation means are dismountable through the corresponding end covers.

The invention is based on the idea that the body is a one-piece part which in itself receives all the forces caused by the drilling strains and in which all the separate actuating means and operational elements to be positioned within the body can be mounted through both end openings of the body part. The one-piece body part does not require any tie rods and the end covers can be separately fastened to the body. Being integral essentially over the whole length thereof, the body is sufficiently steady as such to be attached directly to the beam of the feeding means by means of slide pieces without any special carriage. All the parts of the drilling machine can be detached from within the body part and replaced without having to detach the body part from the feeding means, which makes maintenance and repair of the drilling machine more simple and rapid. Since the body part does not comprise any tie rods and large connecting surfaces, the body part is light and inexpensive. By virtue of the integral body part, the required housings can be easily machined so that they are accurately concentric.

Figure 2:
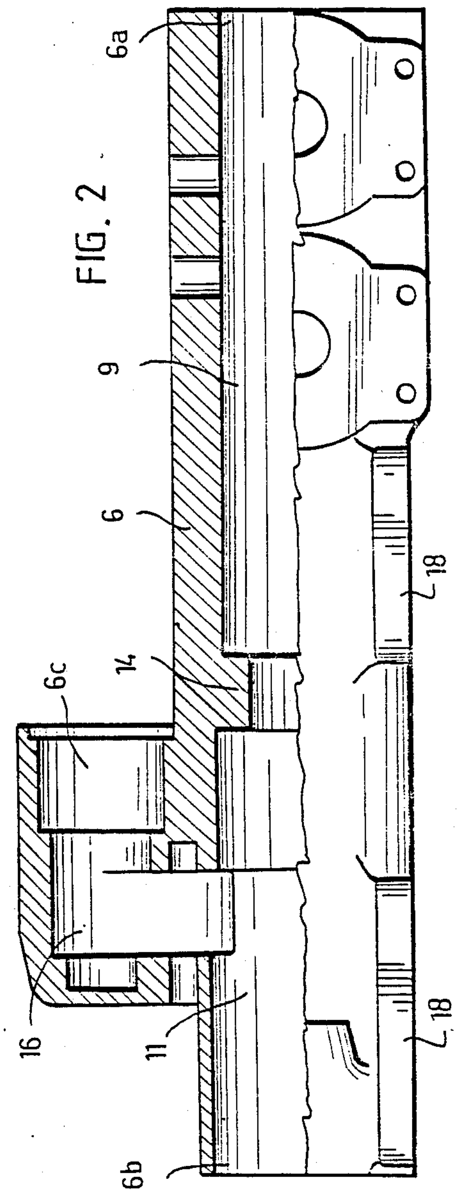

The invention will be described in the following in more detail with reference to the attached drawing, wherein FIG. 1 is a partial axial section in side view of a drilling machine provided with a body construction according to the invention, and FIG. 2 is a partial axial section in side view of a body part.

The drilling machine shown in the drawing mainly comprises a body construction 1, a percussion means 2, a rotation means 3, a rotation machinery 4, and a shank 5.

The body construction 1 comprises a one-piece body part 6 having essentially the same length as the drilling machine, and end covers 7, 8 positioned at opposite ends of the body part. The body part is provided with a cylindrical housing 9 for the percussion means which is inserted into the housing as a single cartridge through an opening 6a provided at the rear end of the body part. The rear end is closed by means of the end cover 7, the fastening screws of which are indicated by the reference numeral 10.

The body part is provided with another housing 11 which is coaxial with the housing 9 of the percussion means and in which the rotation bushing 12 is mounted rotatably. The rotation bushing is inserted into the housing through an opening 6b provided at the front end of the body part so that it bears on an annular supporting shoulder 14 of the body part through an axial bearing 13. The shank 5 is inserted into the rotation bushing axially slideably but unrotatably. The front end of the body part is closed by means of the end cover 8, the fastening screws of which are indicated by the reference numeral 15. The housing 11 is stepped in order that the rotation bushing and its bearing surfaces could be mounted in place through the front opening.

The body part is further provided with a third housing 16 for the rotation machinery 4, and intermediate gear 17 of which is in rotational engagement with the rotation bushing 12. The rotation machinery and its intermediate gear are mounted in the housing through an opening 6c formed in the body part.

It is noted that the body part forms an integral rigid unit which does not require any tie rods to be kept together. The body part can be mounted on the feeding means of the drilling equipment without any special carriage, because the body part is in one piece. For this purpose the body part is provided with supporting lugs 18 from which the drilling machine is fastened to slide pieces 20 by means of bolts 19, the slide pieces being displaceable along a feeding beam 21.

It is also noted that the inner parts of the body part can be mounted in place and, if required, replaced in a simple manner through the end openings of the body part without having to detach the body part from the feeding means.

The drawing and the description related thereto are only intended to illustrate the idea of the invention. In its details the body construction according to the invention may vary within the scope of the claims. Accordingly, it may be advantageous in some cases to form the housing intended for the rotation machinery in a separate body which is fastened to the side of the body part.

I claim:

1. A body construction for a drilling machine, comprising:

an integral body (6) having two, axially successive housing spaces (9, 11) therethrough;

a shank (5) axially in one of the housing spaces (11) of the integral body (6) and projecting at one end therefrom, away from the other of the housing spaces (9) of the integral body (6);

rotation means in the one housing space (11) of the integral body (6) between the shank (5) in the one housing space (11) and the integral body (6) thereabout for rotating the shank (5) about its axis in the one housing space (11) of the integral body (6);

percussion means (2) axially movable in the other housing space (9) of the integral body (6) for axial percussive cooperation with the opposite end of the shank (5); and two end cover means (7, 8) connectable to the integral body (6) for respectively covering axially opposite ends of the housing spaces (9, 11) of the integral body (6) with the one end of the shank (5) projecting through the one covering the corresponding end of the one housing space (11) of the integral body (6) when connected to the integral body and for allowing removal of the rotation and percussion means from the housing spaces when not connected to the integral body (6).

2. A body construction according to claim 1, characterized in that the integral body part (6) further comprises a housing (16) for a rotation machinery (4).

3. A body construction according to claim 1, characterized in that the end cover (8) adjacent to the rotation means (3) is provided with bearings for the shank (5).

4. A body construction according to claim 1, characterized in that the body part (6) is provided with supported lugs (18) for securing the drilling machine to slide members (20) provided in the feeding means (21).

5. A body construction according to claim 1, characterized in that an integral annular support shoulder (14) is provided in the body part (6) between the housing (9) of the percussion means (2) and the housing (11) of the rotation means (3).

6. A body construction according to claim 1, wherein the rotation means comprises a rotation bushing (12) provided with a toothed rim rotatably mounted in the one housing space (11) of the integral body (6) by opposite end portions on opposite sides of the toothed rim.

* * * * *